US012566463B2

(12) United States Patent
Varma et al.

(10) Patent No.: US 12,566,463 B2
(45) Date of Patent: Mar. 3, 2026

(54) HIGH-SPEED HARDWARE-BASED DVFS SYSTEM USING FREQUENCY LOCK LOOP AND ON-DIE VOLTAGE CONTROLLER

(71) Applicant: MediaTek Inc., Hsinchu City (TW)

(72) Inventors: Anshul Varma, San Jose, CA (US); Hsin-Chen Chen, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 15 days.

(21) Appl. No.: 18/885,866

(22) Filed: Sep. 16, 2024

(65) Prior Publication Data

US 2025/0093896 A1     Mar. 20, 2025

Related U.S. Application Data

(60) Provisional application No. 63/583,598, filed on Sep. 19, 2023.

(51) Int. Cl.
*G05F 1/46*     (2006.01)
*G06F 1/324*    (2019.01)
*G06F 1/3296*   (2019.01)

(52) U.S. Cl.
CPC ............... *G05F 1/46* (2013.01); *G06F 1/324* (2013.01); *G06F 1/3296* (2013.01)

(58) Field of Classification Search
None
See application file for complete search history.

(56) References Cited

U.S. PATENT DOCUMENTS 9,377,793 B2 *  6/2016  Valka ........................ G05F 1/10
9,766,649 B2 *  9/2017  Felix ........................ G06F 1/08

11,146,278 B2 *  10/2021  Miro Panades ......... H03L 7/181
11,360,541 B2 *   6/2022  Kosonocky .............. G06F 1/28
2012/0324250 A1   12/2012  Chakraborty
2013/0311792 A1   11/2013  Ponnathota
2024/0146316 A1 *  5/2024  Chen ..................... H03L 7/0991

FOREIGN PATENT DOCUMENTS

CN     109510621 B     6/2022

OTHER PUBLICATIONS

Extended European Search Report and written opinion, EP 24-20-1471, dated Dec. 17, 2024.

* cited by examiner

*Primary Examiner* — Thomas J. Hiltunen
(74) *Attorney, Agent, or Firm* — Tong J. Lee

(57)     ABSTRACT

A voltage controller circuit is provided for dynamic frequency and voltage scaling. The voltage controller circuit receives an error signal indicating a frequency error and a code error. The frequency error indicates a first difference between a target frequency and an actual frequency generated by an oscillator, and the code error indicates a second difference between a minimum code and an actual code with which the oscillator is configured to generate the actual frequency. The minimum code corresponds to a maximum frequency that the oscillator generates for a processor to safely operate under a given voltage. The voltage controller circuit calculates a voltage correction value based on the error signal, a first gain parameter for the frequency error, and a second gain parameter for the code error, and sends a request to a power management circuit to cause an updated voltage to be supplied to the processor.

20 Claims, 5 Drawing Sheets

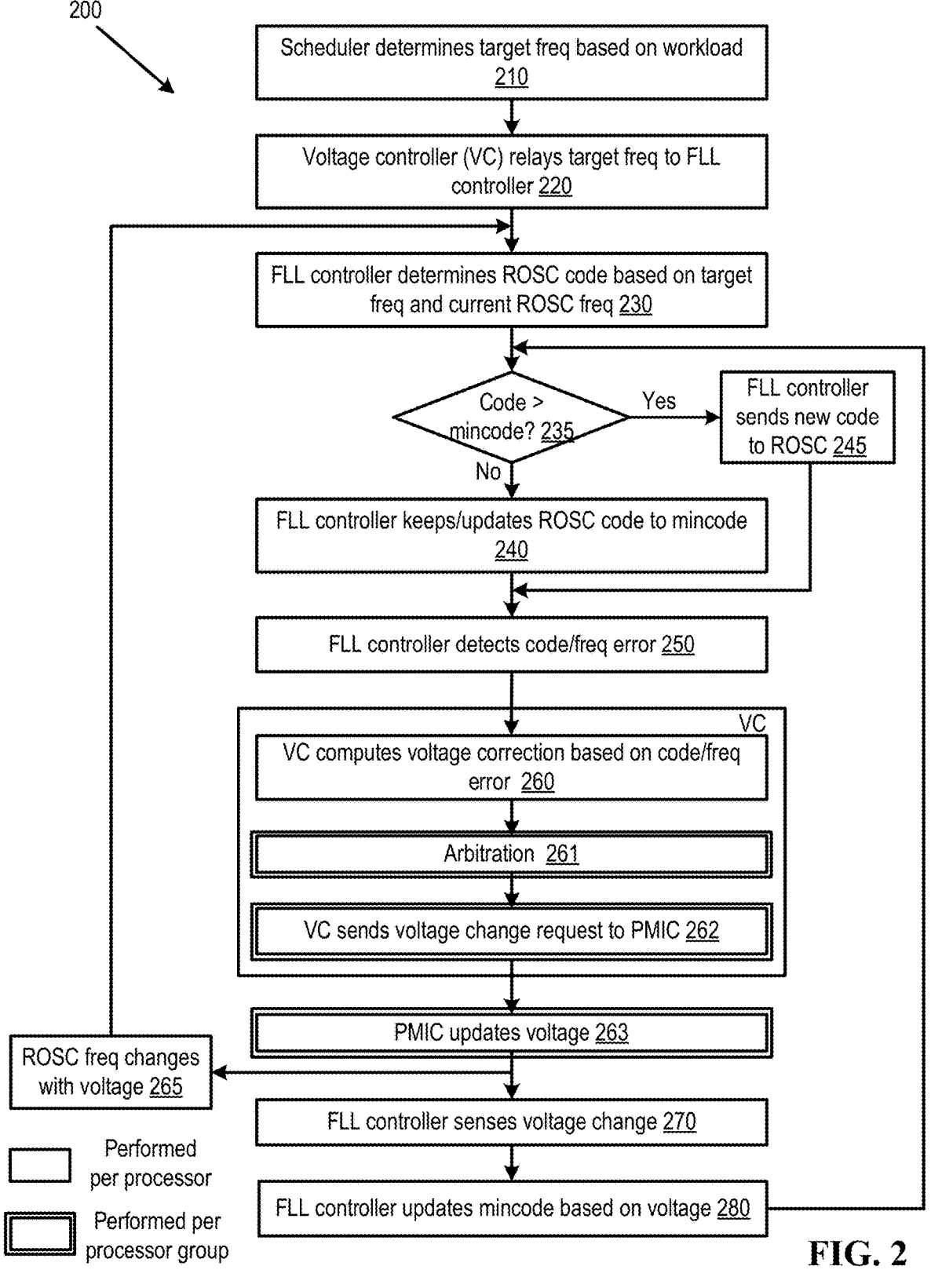

200

Scheduler determines target freq based on workload
210

Voltage controller (VC) relays target freq to FLL controller 220

FLL controller determines ROSC code based on target freq and current ROSC freq 230

Code > mincode? 235

Yes → FLL controller sends new code to ROSC 245

No

FLL controller keeps/updates ROSC code to mincode 240

FLL controller detects code/freq error 250

VC

VC computes voltage correction based on code/freq error 260

Arbitration 261

VC sends voltage change request to PMIC 262

PMIC updates voltage 263

ROSC freq changes with voltage 265

FLL controller senses voltage change 270

FLL controller updates mincode based on voltage 280

☐ Performed per processor

☐ Performed per processor group

FIG. 2

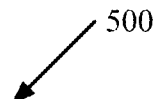

500

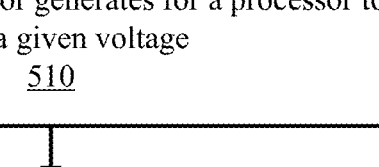

Receive an error signal indicating a frequency error and a code error. The frequency error indicates a first difference between a target frequency and an actual frequency generated by an oscillator, and the code error indicates a second difference between a minimum code and an actual code with which the oscillator is configured to generate the actual frequency. The minimum code corresponds to a maximum frequency that the oscillator generates for a processor to safely operate under a given voltage
510

Calculate a voltage correction value based on the error signal, a first gain parameter for the frequency error, and a second gain parameter for the code error
520

Send a request from the voltage controller circuit to a power management circuit to cause an updated voltage to be supplied to the processor
530

FIG. 5

HIGH-SPEED HARDWARE-BASED DVFS SYSTEM USING FREQUENCY LOCK LOOP AND ON-DIE VOLTAGE CONTROLLER

CROSS-REFERENCE TO RELATED APPLICATIONS

This application claims the benefit of U.S. Provisional Application No. 63/583,598 filed on Sep. 19, 2023, the entirety of which is incorporated by reference herein.

TECHNICAL FIELD

Embodiments of the invention relate to hardware-based dynamic voltage frequency scaling (DVFS) in a computing system.

BACKGROUND OF THE INVENTION

Dynamic voltage and frequency scaling (DVFS) is a power management technique used in computing devices to dynamically adjust the voltage and frequency of a processor based on the performance demands. One goal of DVFS is to reduce power consumption and heat generation, thereby improving the energy efficiency of the system while maintaining performance. The system continuously monitors the workload and performance requirements of the processor. When a processor is under a heavy workload, its frequency can be increased to achieve a higher performance. With the frequency increase, the processor requires a higher voltage to perform its operations and maintain stability. However, increasing the voltage can cause a significant increase in power consumption and heat generation. Thus, when the processor's workload is reduced, the system decreases the voltage and frequency to save power and reduce heat generation.

Manufacturers often design processors to operate within specific voltage and frequency ranges to maintain a balance between performance, power consumption, and reliability. The relationship between a target frequency and its corresponding voltage can be described by a voltage-frequency table. According to the table, a software driver sets the voltage corresponding to the frequency demand, and requests a voltage adjustment at the edge of the next time interval, where the time intervals are fixed-length time intervals (e.g., 1 millisecond edge). Voltage updates tied to fixed-length time intervals introduce a lag in the system response. This lag creates both performance loss and power inefficiency. Thus, there is a need for improving the voltage and frequency scaling technique in a processor system.

SUMMARY OF THE INVENTION

In one embodiment, a method is provided for dynamic frequency and voltage scaling. The method includes a voltage controller circuit receiving an error signal indicating a frequency error and a code error. The frequency error indicates a first difference between a target frequency and an actual frequency generated by an oscillator, and the code error indicates a second difference between a minimum code and an actual code with which the oscillator is configured to generate the actual frequency. The minimum code corresponds to a maximum frequency that the oscillator generates for a processor to safely operate under a given voltage. The method further includes the voltage controller circuit calculating a voltage correction value based on the error signal, a first gain parameter for the frequency error, and a second gain parameter for the code error; and sending a request from the voltage controller circuit to a power management circuit to cause an updated voltage to be supplied to the processor.

In another embodiment, a system is provided to perform dynamic frequency and voltage scaling. The system includes a power management circuit; a plurality of processors, each processor coupled to an oscillator operative to generate a clock signal; and a voltage controller circuit coupled to the plurality of processors. The voltage controller circuit is operative to perform the aforementioned method.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 2 is a flow diagram illustrating a process for dynamically adjusting frequency and voltage according to one embodiment.

FIG. 5 is a diagram illustrating a method for hardware-based DVFS according to one embodiment.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In this disclosure, a high-speed hardware-based DVFS system is described. The disclosed system utilizes a Frequency Locked Loop (FLL) controller and an on-die voltage controller. The FLL controller provides protection against over-frequency system shut down while the on-die voltage controller provides substantially accurate and fast voltage adjustments. The DVFS system saves power by using minimum voltage required for a performance target, updating the operating voltage as fast as a few tens of microseconds.

Figure 1:
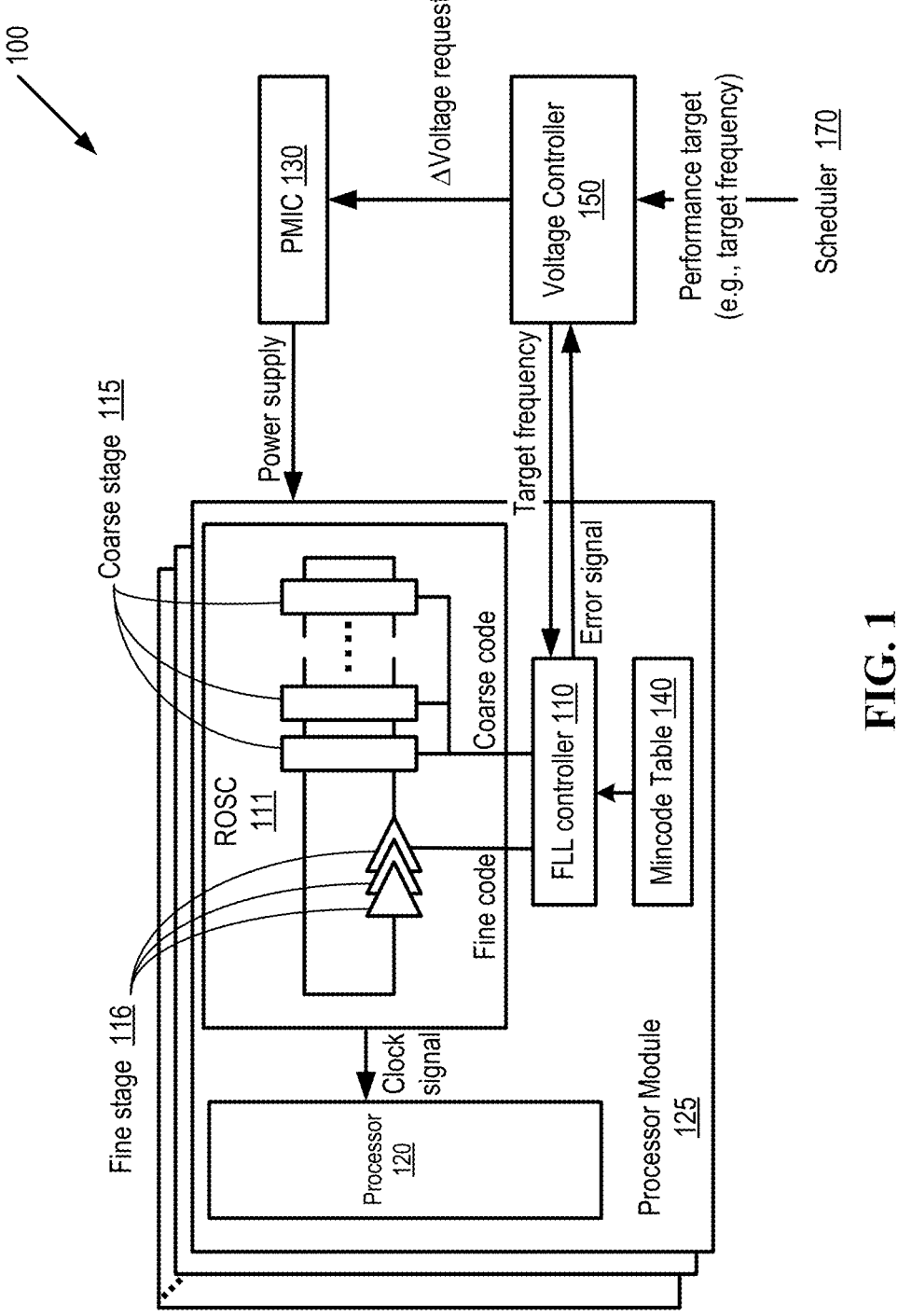
FIG. 1 is a block diagram illustrating a hardware-based DVFS system according to one embodiment.

FIG. 1 is a block diagram illustrating a hardware-based DVFS system ("system 100") according to one embodiment.

The system 100 includes one or more processor modules 125 coupled to a power management unit (e.g., a power management integrated circuit (PMIC) 130) and a voltage controller 150. In one embodiment, the processor modules 125 and the voltage controller 150 are on the same die. Each processor module 125 includes a processor 120, an FLL controller 110, an oscillator (e.g., a ring oscillator (ROSC) 111), and a mincode table 140 used by the FLL controller 110 to configure the frequency of the ROSC 111. Each processor 120 receives a clock signal from the ROSC 111 in the same processor module 125. The processor 120 may be a central processing unit (CPU), a microprocessor, a graphics processing unit (GPU), a digital processing unit (DSP), a neural processing unit (NPU), or another general-purpose and/or special-purpose processing circuitry.

The ROSC 111 generates a clock signal at a programmable clock frequency. The ROSC 111 has a programmable number of delay stages, which include coarse stages 115 and fine stages 116. Each coarse stage 115 causes N time units of delay and each fine stage 116 causes M time units of delay, where N is greater than M. In one embodiment, the FLL controller 110 may be a finite state machine (FSM), which provides a code (CC, FC) to the ROSC 111, where CC is a coarse code corresponding to the number of activated coarse stages 115 and FC is a fine code corresponding to the number of activated fine stages 116. A higher code means more delay in the ROSC 111 and, therefore, a lower clock frequency; a lower code means less delay in the ROSC 111 and, therefore, a higher clock frequency. The processor 120 operates most efficiently when the code is set to the minimum code ("mincode") for a given operating voltage. In one embodiment, the mincode table 140 stores a set of mincodes and the corresponding voltage levels. Each mincode corresponds to a given voltage level. The mincodes may be determined during the manufacturing speed test of the processor 120. When configured with a mincode corresponding to a given voltage, the ROSC 111 operates at the minimum delay and outputs the maximum frequency that the processor 120 can safely operate at the given voltage.

In one embodiment, the operating system of the system 100 includes an energy-aware scheduler ("schedule 170") to set a performance target for each processor 120. The performance target may be indicated as a target frequency. The FLL controller 110 configures the ROSC 111 with a code such that the clock frequency can closely track or lock to the target frequency. The FLL controller 110 can dynamically adjust the code to the extent not lower than the mincode for the present operating voltage. The FLL controller 110 can further prompt the voltage controller 150 to adjust the operating voltage.

FIG. 2 is a flow diagram illustrating a process 200 for dynamically adjusting frequency and voltage according to one embodiment. In FIG. 2, single-lined blocks represent operations performed by each processor, and double-lined blocks represent operations performed by each processor group (e.g., CPUs sharing the same buck from the PMIC 130). The process 200 may be iterated multiple times when a new target frequency is given, and may terminate when the calculated voltage correction value is within a tolerance value. As the voltage controller 150 is on-die hardware, the voltage corrections can be performed in a much faster converging control loop than software-based voltage corrections.

Referring also to FIG. 1, at step 210, the scheduler 170 determines a target frequency for a processor 120, e.g., based on the workload of the processor 120 or other runtime conditions of the processor 120. At step 220, the voltage controller 150 relays the target frequency to the FLL controller 110. At step 230, the FLL controller 110 determines a code for the ROSC 111 based on the target frequency and the current ROSC frequency. That is, if the target frequency is different from the current ROSC frequency, the FLL controller 110 determines for the ROSC 111 what new code to run to achieve the target frequency. If at step 235 the new code is greater than the mincode, the FLL controller 110 at step 245 sends the new code to the ROSC 111, and the process 200 proceeds to step 250. If at step 235 the new code is less than the mincode, the FLL controller 110 at step 240 keeps the current ROSC code, as the ROSC 111 cannot run a code lower than the mincode. At step 250, the FLL controller 110 detects a code error and/or a frequency error, and sends an error signal indicating the detected error(s) to the voltage controller 150. In some scenarios the error signal may indicate that one of the code error and the frequency error is zero; in some other scenarios the error signal may indicate that both the code error or the frequency error are nonzero. Steps 260, 261, and 262 are performed by the voltage controller (VC) 150. The voltage controller 150 at step 260 computes a voltage correction value based on the error signal (e.g., E1, E2, . . . , En) from each FLL controller 110 of each processor 120. At step 261 the voltage controller 150 performs arbitration to select one voltage correction value from all the voltage correction values calculated for all of the processors 120 in the processor group. The voltage correct value may be selected based on one or more criteria including but not limited to: the maximum voltage correction value, the minimum voltage correction value, the mean voltage correction value, processor priority, etc. Thus, one of the processors 120 becomes the dominant processor in the processor group, as all processors 120 in the processor group are to receive the same voltage corresponding to the maximum voltage correction value that is required to run the dominant processor. At step 262 the voltage controller 150 sends a voltage change request to the PMIC 130 indicating the selected voltage correction value, and the PMIC 130 at step 263 updates the voltage supplied to the processors 120. Steps 261, 262, and 263 are executed once for the CPU group in each iteration.

The voltage change at step 263 triggers two paths of actions. First, at step 265 the ROSC frequency changes with the updated voltage. For example, without changing the ROSC code, a voltage increase can cause the ROSC frequency to increase and a voltage decrease can cause the ROSC frequency to decrease. The FLL controller 110 at step 235 checks the changed ROSC frequency against the target frequency, and the process 200 continues to the next iteration to correct the remaining frequency difference from the target frequency. Secondly, the FLL controller 110 senses the voltage change at step 270 and updates the mincode based on the updated voltage at step 280. Then the process 200 returns to step 235 in which the current ROSC code is checked against the updated mincode. If the mincode has increased and the current ROSC code is no longer greater than the mincode, the FLL controller 110 updates the ROSC code to the mincode at step 240. The process 200 then continues with the next iteration until the voltage correction value is less than a tolerance value.

In one scenario, one CPU ("dominant CPU") in a CPU group may have a change of target frequency that causes a voltage change. However, the other CPUs ("non-dominant CPU") in the CPU group may have a fixed target frequency. The voltage change applies to all CPUs in the group, which causes ROSC frequency to change (step 265) and mincode updates (step 280) for all of the CPUs. The FLL controller 110 of a non-dominant CPU at step 230 determines a new ROSC code to compensate for the ROSC frequency change caused by the voltage change, and sends this new ROSC code to the ROSC 111 at step 245 if this new ROSC code passes the check at step 235. The new ROSC code cannot be lower than the updated mincode. If the new ROSC code is lower than the updated mincode, either the current ROSC code stays as is (when the current ROSC code is greater than the updated mincode), or the ROSC code is updated to the updated mincode.

Referring also to FIG. 1, in one embodiment, the voltage controller 150 does not send voltage correction requests to the PMIC 130 at a fixed rate. A fixed request rate would force the voltage corrections to be made at a fixed rate. In the embodiments herein, the voltage controller 150 is an on-die hardware circuit, which sends voltage correction requests dynamically when an error (i.e., a frequency and/or code error) is detected by the FLL controller 110. The voltage controller 150 can dynamically adjust the rate at which the requests are sent to the PMIC 130. Moreover, the voltage controller 150 is a high-bandwidth, high-speed hardware controller as it enables detected errors from multiple processor modules 125 to efficiently share the PMIC interface such that large errors can be reduced to small errors at a faster rate and small errors can be corrected at a slower rate. More specifically, the voltage controller 150 can provide both quick initial voltage corrections and slow subsequent voltage corrections. For example, the voltage controller 150 may send voltage correction requests to the PMIC 130 at a decreasing rate. Thus, quick voltage corrections are made in the first one or more iterations when a new target frequency is given; subsequent voltage corrections are slowed down. In some scenarios, the first iteration may provide 90% of the needed voltage correction to achieve the target frequency. When it comes closer to the optimum operating point (e.g., the target frequency), voltage corrections are slowed down such that the PMIC interface can be freed up for other circuit blocks.

Figure 3:
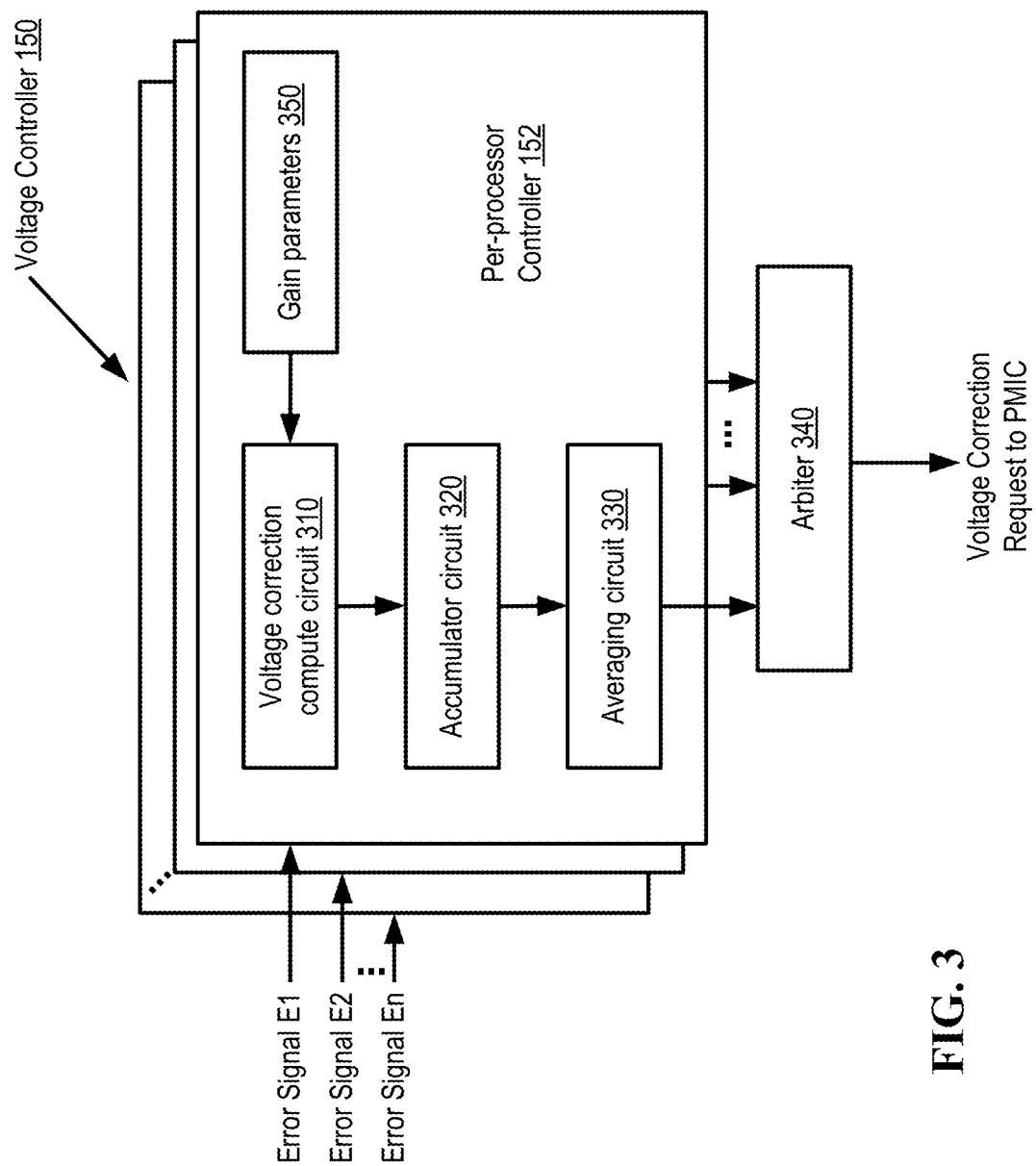
FIG. 3 is a block diagram illustrating a voltage controller according to one embodiment.

FIG. 3 is a block diagram illustrating the voltage controller 150 according to one embodiment. In a multi-processor system, the voltage controller 150 is coupled to multiple processors 120 and can compute voltage corrections for each of the processors 120. The voltage controller 150 may include n per-processor controller 152, each of which controlling the voltage correction of a corresponding processor 120. Each per-processor controller 152 receives an error signal from a corresponding processor 120 and calculates a voltage correction for the processor 120. In a scenario where the multiple processors 120 have different target frequencies and share a common voltage, the voltage controller 150 includes an arbiter 340 to select a voltage correction value among all of the processors 120 and send a voltage correction request to the PMIC 130 indicating this selected voltage correction value.

The per-processor controller 152 in the voltage controller 150 includes a voltage correction compute circuit 310 to compute voltage correction values. In one embodiment, the voltage correction compute circuit 310 computes a dynamic voltage correction based on an error signal received from FLL controller 110. The error signal includes a combination of the frequency error (FreqErr) and the code error (CodeErr). The computation of the voltage correction value is as follows:

$$\Delta Vf = FreqErr \cdot \frac{dV}{dF}; \Delta Vc = CodeErr \cdot \frac{dV}{dC}$$

6

In one embodiment, gain parameters 350 (i.e., dV/dF and dV/dC) are tuned during the manufacturing process to achieve fast convergence and no oscillations. The gain parameters 350 may be tuned for each processor 120; thus, different processors 120 may have different gain parameters 350. The gain parameters 350 includes a first gain parameter (dV/dF) for the frequency error and a second gain parameter (dV/dC) for the code error. The voltage correction compute circuit 310 calculates $\Delta Vf$, which is a product of the first gain parameter and the frequency error, and $\Delta Vc$, which is a product of the second gain parameter and the code error. The voltage correction compute circuit 310 may normalize $\Delta Vf$ and $\Delta Vc$ to a common scale and then add the two normalized values to obtain the voltage correction value.

The per-processor controller 152 in the voltage controller 150 may further include an accumulator circuit 320 and an averaging circuit 330. The accumulator circuit 320 accumulates the voltage correction values over a time period to clear out residual errors. The averaging circuit 330 calculates an average of the accumulated voltage correction values over the time period to protect from voltage spikes and ripples. In one embodiment, the time period is adapted to the rate at which the voltage controller 150 sends voltage correction requests to the PMIC 130; e.g., shorter time periods in the first one or more iterations when a new target frequency is given, and longer time periods in the subsequent iterations when the voltage corrections slow down. In one embodiment, the time period increases over the multiple iterations until it reaches a maximum value. When the voltage controller 150 sends the voltage correction request to the PMIC 130, the PMIC 130 in response adjusts the operating voltage of the ROSC 111 and the processor 120 coupled to the ROSC 111 accordingly.

Figure 4:
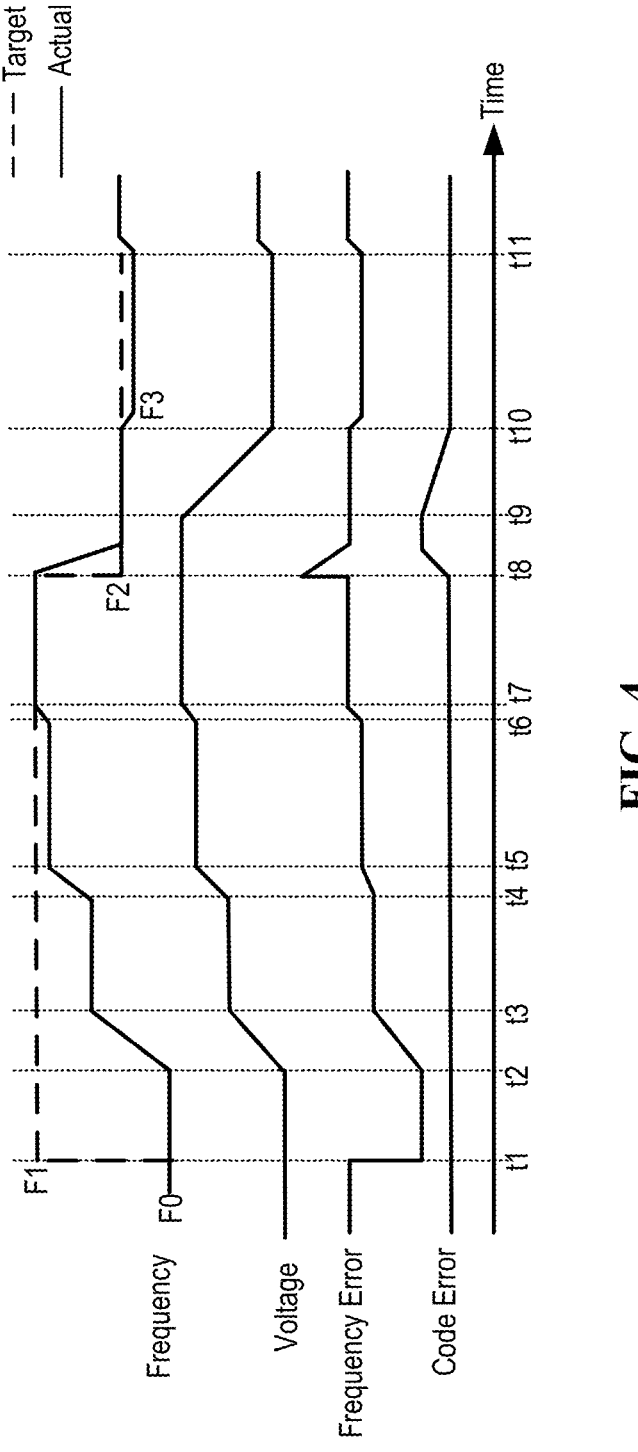
FIG. 4 is a timing diagram illustrating an example of voltage corrections according to one embodiment.

FIG. 4 is a timing diagram illustrating an example of voltage corrections according to one embodiment. The example shows that the voltage controller 150 enables power saving as well as fast convergence to target performance. Referring also to FIG. 1, At time t1, the ROSC 111 generates a clock frequency (referred to as the actual frequency F0) and the FLL controller 110 receives a request for a target frequency F1, where F1>F0. The difference between F0 and F1 is a frequency error. At t1, the ROSC 111 cannot increase the actual frequency as the present operating voltage is insufficient to support any frequency increase. That is, the actual frequency is the maximum frequency for the present operating voltage, and the code used by the ROSC 111 is the mincode for the present operating voltage. The FLL controller 110 sends an error signal indicating the frequency error and zero code error (as neither the frequency nor the voltage changes) to the voltage controller 150. The voltage controller 150 computes a voltage correction value based on the error signal and requests the PMIC 130 to increase the voltage. As the PMIC 130 increases the voltage supplied to the processor 120 from t2 to t3, the clock frequency generated by the ROSC 111 increases and the frequency error decreases. The FLL controller 110 also updates the mincode corresponding to the increased voltage. At time t3, which is the end of the first iteration, the actual frequency is still lower than the target frequency F1 and the frequency error is still nonzero. Thus, a second iteration (from t3 to t5) and a third iteration (from t5 to t7) are performed to further reduce the frequency error. In this example, it takes three iterations for the actual frequency to match the target frequency F0. The code error stays zero from t1 to t7, as the FLL controller 110 updates the mincode every time the operating voltage increases.

At t8, the target frequency drops to F2, which may be caused by decreased workload. F2 is below the actual frequency F1 at t8. Thus, there is a frequency error (i.e., F1 minus F2). The PMIC 130 has not been requested to decrease the supplied voltage at t8; thus, the processor 120 is operating at a higher voltage than necessary and is wasting power. To decrease the actual frequency to the target frequency, the FLL controller 110 increases the code used to configure the delay stages in the ROSC 111, causing a code error to occur. The code error indicates that the ROSC 111 does not operate at the mincode corresponding to the present operating voltage. At 19, the frequency error is zero as the actual frequency has already reached the target frequency F2. The FLL controller 110 sends an error signal indicating the code error and zero frequency error to the voltage controller 150. The voltage controller 150 computes a voltage correction value based on the error signal and requests the PMIC 130 to decrease the voltage supplied to the processor 120. As the PMIC 130 decreases the voltage from 19 to t10, the FLL controller 110 updates the mincode corresponding to the decreased voltage. In this example, the voltage decrease overshoots the target voltage corresponding to the target frequency F2, causing the actual frequency to be reduced to F3 (which corresponds to the decreased voltage). As F3 is lower than F2, there is a frequency error. The FLL controller 110 again sends an error signal indicating the frequency error and zero code error to the voltage controller 150, which computes a voltage correction value and requests the PMIC 130 to raise the voltage supplied to the processor 120. When the supplied voltage is raised at t11, the actual frequency generated by the ROSC 111 locks to the target frequency F2.

FIG. 5 is a flow diagram illustrating a method 500 for hardware-based DVFS according to one embodiment. In one embodiment, the method 500 may be performed by a voltage controller circuit, such as the voltage controller 150 of FIG. 1.

The method 500 starts with step 510 in which a voltage controller circuit receives an error signal indicating a code error and a frequency error. The frequency error indicates a first difference between a target frequency and an actual frequency generated by an oscillator, and the code error indicates a second difference between a minimum code and an actual code with which the oscillator is configured to generate the actual frequency. The minimum code corresponds to a maximum frequency that the oscillator generates for a processor to safely operate under a given voltage. At step 520, the voltage controller circuit calculates a voltage correction value based on the error signal, a first gain parameter for the frequency error, and a second gain parameter for the code error. At step 530, the voltage controller circuit sends a request to a power management circuit to cause an updated voltage to be supplied to the processor.

In one embodiment, the voltage correction value calculated by the voltage controller circuit includes the first gain parameter multiplied by the frequency error and the second gain parameter multiplied by the code error. In one embodiment, the voltage controller circuit obtains a normalized first voltage adjustment by normalizing a product of the first gain parameter and the frequency error to a common scale, and obtains a normalized second voltage adjustment by normalizing a product of the second gain parameter and the code error to the common scale. The voltage controller circuit then adds the normalized first voltage adjustment and the normalized second voltage adjustment to obtain the voltage correction value. In one embodiment, the voltage controller circuit performs multiple iterations of receiving error signals, calculating voltage correction values, and sending requests to the power management circuit until the voltage correction value is less than a tolerance value. In one embodiment, the first one of the iterations takes a shorter time than subsequent iterations. In one embodiment, the voltage controller circuit sends requests to the power management circuit at a decreasing rate over a plurality of iterations.

In one embodiment, the voltage controller circuit calculates respective voltage correction values for a plurality of processors; selects one of the respective voltage correction values; and requests the power management circuit for voltage correction by the selected one of the respective voltage correction values.

In one embodiment, the voltage controller circuit accumulates voltage correction values over a time period in each of a plurality of iterations to obtain an accumulated voltage correction. The time period increases over the iterations until reaching a maximum value. In one embodiment, the voltage controller circuit averages the accumulated voltage correction to obtain an averaged voltage correction, and sends the request indicating the averaged voltage correction to the power management circuit.

In one embodiment, the first gain parameter and the second gain parameter are tuned at manufacturing time for each of a plurality of processors that are on the same die as the voltage controller circuit. In one embodiment, the voltage controller circuit receives the target frequency from a scheduler that determines the target frequency of the processor, and sends the target frequency to an FLL controller, which controls the actual frequency generated by the oscillator.

The operations of the flow diagram of FIG. 5 have been described with reference to the exemplary embodiment of FIG. 1. However, it should be understood that the operations of the flow diagram of FIG. 5 can be performed by embodiments of the invention other than the embodiment of FIG. 1, and the embodiment of FIG. 1 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:
1. A method for dynamic frequency and voltage scaling, comprising:
   receiving, by a voltage controller circuit, an error signal indicating a frequency error and a code error, wherein the frequency error indicates a first difference between a target frequency and an actual frequency generated by an oscillator, and the code error indicates a second difference between a minimum code and an actual code with which the oscillator is configured to generate the actual frequency, and wherein the minimum code corresponds to a maximum frequency that the oscillator generates for a processor to safely operate under a given voltage;

calculating, by the voltage controller circuit, a voltage correction value based on the error signal, a first gain parameter for the frequency error, and a second gain parameter for the code error; and sending a request from the voltage controller circuit to a power management circuit to cause an updated voltage to be supplied to the processor.

2. The method of claim 1, wherein the voltage correction value calculated by the voltage controller circuit includes the first gain parameter multiplied by the frequency error and the second gain parameter multiplied by the code error.

3. The method of claim 1, further comprising:

obtaining a normalized first voltage adjustment by normalizing a product of the first gain parameter and the frequency error to a common scale;

obtaining a normalized second voltage adjustment by normalizing a product of the second gain parameter and the code error to the common scale; and adding the normalized first voltage adjustment and the normalized second voltage adjustment to obtain the voltage correction value.

4. The method of claim 1, further comprising:

calculating respective voltage correction values for a plurality of processors;

selecting one of the respective voltage correction values; and requesting the power management circuit for voltage correction by the selected one of the respective voltage correction values.

5. The method of claim 1, further comprising:

performing a plurality of iterations of the receiving, the calculating, and the sending in response to the target frequency, wherein a first one of the iterations takes a shorter time than subsequent iterations.

6. The method of claim 1, further comprising:

sending requests from the voltage controller circuit to the power management circuit at a decreasing rate over a plurality of iterations.

7. The method of claim 1, wherein calculating the voltage correction further comprises:

accumulating voltage correction values over a time period in each of a plurality of iterations of the receiving, the calculating, and the sending to obtain an accumulated voltage correction, wherein the time period increases over the iterations until reaching a maximum value.

8. The method of claim 7, further comprising:

averaging the accumulated voltage correction to obtain an averaged voltage correction; and sending the request indicating the averaged voltage correction to the power management circuit.

9. The method of claim 1, wherein the first gain parameter and the second gain parameter are tuned at manufacturing time for each of a plurality of processors that are on a same die as the voltage controller circuit.

10. The method of claim 1, further comprising:

receiving the target frequency from a scheduler that determines the target frequency of the processor; and sending the target frequency to a frequency locked loop (FLL) controller, which controls the actual frequency generated by the oscillator.

11. A system operative to perform dynamic frequency and voltage scaling, comprising:

a power management circuit;

a plurality of processors, each processor coupled to an oscillator operative to generate a clock signal; and a voltage controller circuit coupled to the plurality of processors, the voltage controller circuit operative to:

receive an error signal indicating a frequency error and a code error, wherein the frequency error indicates a first difference between a target frequency and an actual frequency generated by the oscillator and provided to one of the processors, and the code error indicates a second difference between a minimum code and an actual code with which the oscillator is configured to generate the actual frequency, and wherein the minimum code corresponds to a maximum frequency that the oscillator generates for the processor to safely operate under a given voltage;

calculate a voltage correction value based on the error signal, a first gain parameter for the frequency error, and a second gain parameter for the code error; and send a request to the power management circuit to cause an updated voltage to be supplied to the processor.

12. The system of claim 11, wherein the voltage correction value calculated by the voltage controller circuit includes the first gain parameter multiplied by the frequency error and the second gain parameter multiplied by the code error.

13. The system of claim 11, wherein the voltage controller circuit is further operative to:

obtain a normalized first voltage adjustment by normalizing a product of the first gain parameter and the frequency error to a common scale;

obtain a normalized second voltage adjustment by normalizing a product of the second gain parameter and the code error to the common scale; and add the normalized first voltage adjustment and the normalized second voltage adjustment to obtain the voltage correction value.

14. The system of claim 11, wherein the voltage controller circuit is further operative to:

calculate respective voltage correction values for a plurality of processors;

select one of the respective voltage correction values; and request the power management circuit for voltage correction by the selected one of the respective voltage correction values.

15. The system of claim 11, wherein the voltage controller circuit is further operative to:

perform a plurality of iterations of the receiving, the calculating, and the sending in response to the target frequency, wherein a first one of the iterations takes a shorter time than subsequent iterations.

16. The system of claim 11, wherein the voltage controller circuit is further operative to:

send requests to the power management circuit at a decreasing rate over a plurality of iterations.

17. The system of claim 11, wherein the voltage controller circuit is further operative to:

accumulate voltage correction values over a time period in each of a plurality of iterations of the receiving, the calculating, and the sending to obtain an accumulated voltage correction, wherein the time period increases over the iterations until reaching a maximum value.

18. The system of claim 17, wherein the voltage controller circuit is further operative to:

average the accumulated voltage correction to obtain an averaged voltage correction; and send the request indicating the averaged voltage correction to the power management circuit.

19. The system of claim 11, wherein the first gain parameter and the second gain parameter are tuned at manufacturing time for each of a plurality of processors that are on a same die as the voltage controller circuit.

20. The system of claim 11, wherein the voltage controller circuit is further operative to:

receive the target frequency from a scheduler that determines the target frequency of the processor; and send the target frequency to a frequency locked loop (FLL) controller, which controls the actual frequency generated by the oscillator.

* * * * *